Nov. 15, 1938.  K. FUWA ET AL  2,137,135
IMPROVED DIELECTRIC MATERIAL AND METHOD FOR MAKING THE SAME
Filed Aug. 14, 1936
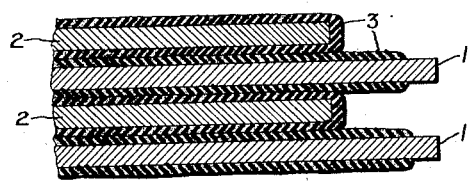
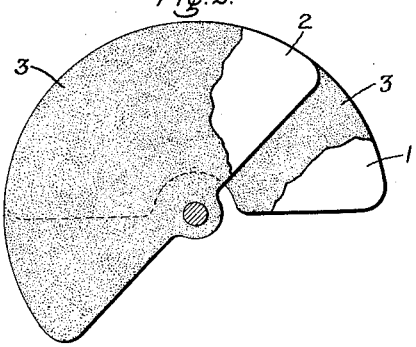
Inventors:
Kitsuzo Fuwa,
Shuyo Ito,
by Harry E. Dunham
His Attorney.

Patented Nov. 15, 1938

2,137,135

UNITED STATES PATENT OFFICE

2,137,135

IMPROVED DIELECTRIC MATERIAL AND METHOD FOR MAKING THE SAME

Kitsuzo Fuwa, Tokyo, and Shuyo Ito, Yokohama, Japan, assignors to General Electric Company, a corporation of New York Application August 14, 1936, Serial No. 96,112
In Japan August 22, 1935

4 Claims. (Cl. 106—12)

The present invention relates to dielectric materials and has for an object the provision of an improved dielectric material having great mechanical and dielectric strength, a high value of dielectric constant and extremely low values of power factor and temperature coefficient of dielectric constant. A further object is the provision of a method for preparing such improved dielectric material.

A particular effect of the invention has been shown by employing a particular material discovered by the present inventors as a dielectric element between plates of a condenser. The following is a description as to said material, the character of the condenser obtained from said material and shows the actual instances of manufacturing the same.

First of all, a mixture is prepared containing the following compounds:

| | Per cent |
|---|---|
| Titanium oxide | over 70 |
| Aluminium oxide | below 10 |
| Magnesium oxide | below 10 |
| Silicic acid | below 15 |
| Other impurities | below 1 |

After baking the above mixture at a temperature about 1400° C. it is further pulverized. The powder obtained in this manner is then coated or blasted on a copper, nickel or aluminium plate or any other metal plate adapted to be used for a condenser plate by employing any suitable binder such as a solution of Celluloid, acetyl cellulose, styrol, or lacquer, and is dried; or this is further heated and pressed to have it baked on the said metal plate. A plurality of coated metal plates obtained in this manner are piled up as desired, or such coated metal plates and noncoated metal plates are combined and piled up to form condensers of intended type.

For a better understanding of our invention, reference is had to the following illustration taken in connection with the accompanying drawing in which Fig. 1 is an enlarged sectional view of a fixed condenser embodying our invention and Fig. 2 is a plan of a variable condenser according to said invention. The numerals 1, 2 indicate both metal plates forming condensers, and 3 represents layers of the aforesaid composition.

The dielectric constant of titanium oxide being considerably great when it is used for a dielectric element of a condenser it may afford an extremely great electrostatic capacity as compared with its volume. However, the said material has such a defect that the temperature coefficient of dielectric constant thereof shows a great negative value. On the other hand the temperature coefficient of dielectric constant of magnesium oxide, aluminium oxide and silicic acid being in positive value it will be possible to make the temperature coefficient of dielectric constant small as desired when any one of these three compounds is mixed into aforesaid titanium oxide. It must be understood that the product obtained by mixing any one of the said three to titanium oxide has still such disadvantages that it has a small mechanical strength and a great power factor. Contrary to this the product obtained according to our invention, that is, by mixing magnesium oxide, aluminium oxide, and silicic acid with titanium oxide at the aforesaid percentage has such advantages over the other combinations that the temperature coefficient of dielectric constant thereof is considerably small while its mechanical strength is great and the power factor small, besides its great voltage resisting power and such a high dielectric constant as from 40 to 90.

When such powder is coated on a metal plate a dielectric layer having a considerably great dielectric constant can be formed. A condenser comprising such a coated metal plate possesses an extremely great electrostatic capacity and sufficiently resists higher voltages in spite of its smaller volume.

What we claim as new and desire to secure by Letters Patent of the United States is:

1. A dielectric material comprised of a heat treated mixture the principal part of which consists of titanium oxide and which has also small but substantial proportions of aluminium oxide, magnesium oxide, and silicic acid homogeneously admixed with said titanium oxide.

2. A dielectric material comprised of a heat treated mixture consisting of at least 70% titanium oxide, less than 10% of aluminium oxide, less than 10% of magnesium oxide, and less than 15% of silicic acid.

3. The method of making a dielectric material which includes the steps of preparing a homogeneous pulverulent mixture consisting of a principal proportion of titanium oxide and small but substantial proportions of aluminium oxide, magnesium oxide, and silicic acid, and baking said mixture at a temperature of about 1400° C.

4. The method of making a dielectric material which includes mixing with a principal proportion of titanium oxide, relatively small but substantial proportions of aluminium oxide, magnesium oxide, and silicic acid in proportions to yield a final product having a relatively low temperature coefficient of dielectric constant, and baking the mixture at about 1400° C.

KITSUZO FUWA.
SHUYO ITO.